United States Patent [19]
Lenihan, III

[11] Patent Number: 5,734,278
[45] Date of Patent: Mar. 31, 1998

[54] LOW-POWER, HIGH-RELIABILITY SWITCHING ROTARY PHASE SHIFTER DEVICE

[76] Inventor: William E. Lenihan, III, 420 S. Catalina Ave. #120, Redondo Beach, Calif. 90277

[21] Appl. No.: 704,168

[22] Filed: Aug. 28, 1996

[51] Int. Cl.$^6$ .................................................. H03K 17/18
[52] U.S. Cl. .......................................... 327/110; 327/374
[58] Field of Search ........................... 327/100, 108–110, 327/112, 141, 142, 146, 155, 198, 291, 293, 294, 333, 309, 312, 374–377, 383, 538, 544, 545, 236, 241, 243, 244, 246

[56] References Cited

U.S. PATENT DOCUMENTS

| | | | |
|---|---|---|---|
| 4,469,961 | 9/1984 | Milberger et al. | 327/110 |
| 4,791,312 | 12/1988 | Weick | 327/333 |
| 5,587,676 | 12/1996 | Chowdhury | 327/333 |

*Primary Examiner*—Margaret Rose Wambach
*Assistant Examiner*—My-Trang Nu Ton

*Attorney, Agent, or Firm*—Leonard A. Alkov; Wanda K. Denson-Low

[57] ABSTRACT

A driver circuit for regulating the current flowing through the coils of a rotary field microwave phase shifter. The circuit includes logic circuitry functions which implements an algorithm to provide decision making capability to avoid failure-inducing conditions, reducing power consumption, and enhancing testability of the circuit. The circuit includes two switches that respectively drive either a positive or a negative voltage to the load, to begin steering the load current to the appropriate direction. The logic circuitry includes a current mode mapping function to determine whether a commanded current value requires positive, negative or no voltage applied to the load. The logic circuitry further includes a finite state machine to control the two switches, to ensure that both switches are never commanded to be conductive at the same time, and to permit toggling of only one of the switches to regulate the current to a target value in a feedback loop. The state machine also provides a test function which disables the current feedback loop of the circuit and generates deterministic patterns for tracing circuit activity.

17 Claims, 5 Drawing Sheets

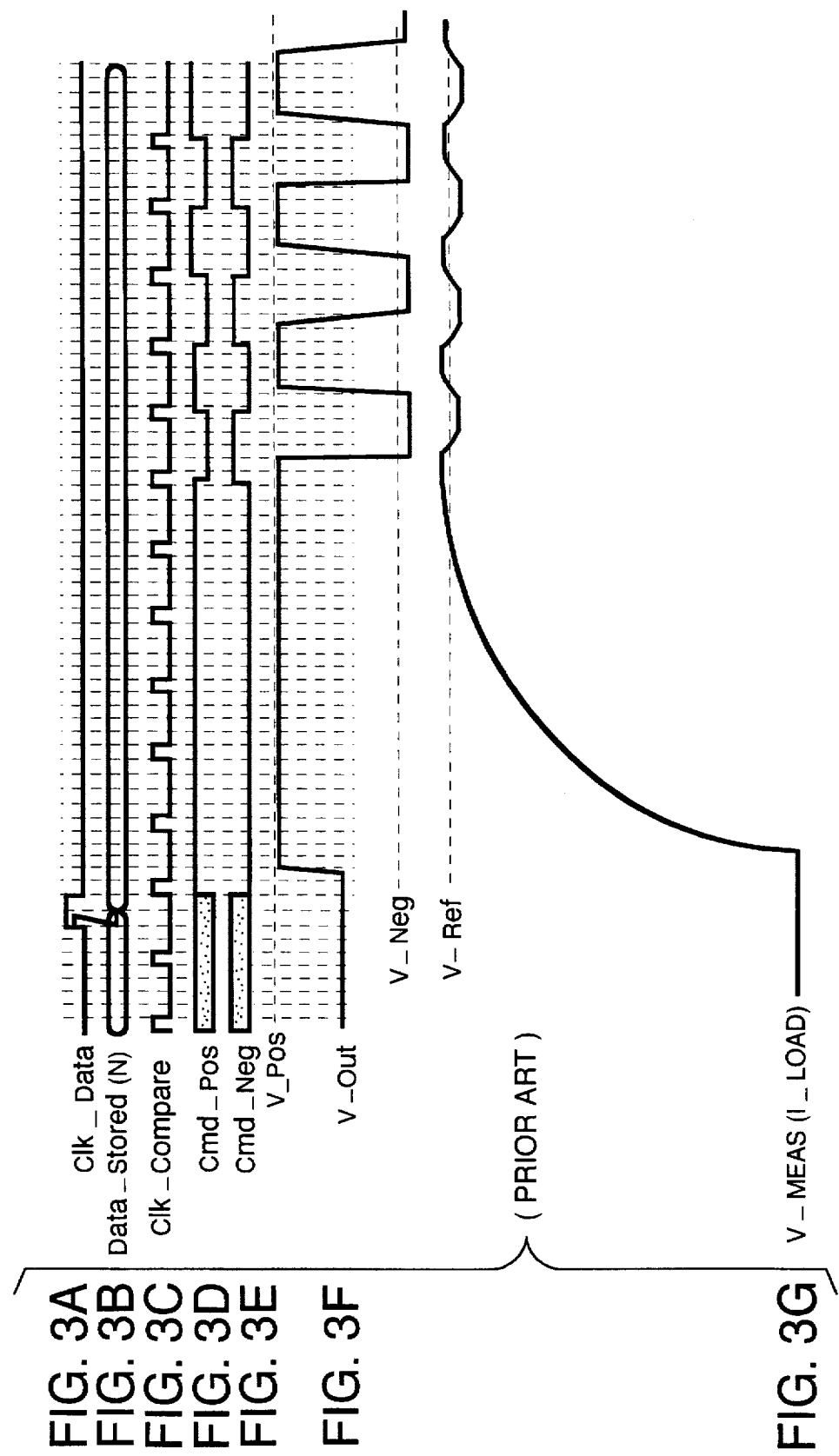

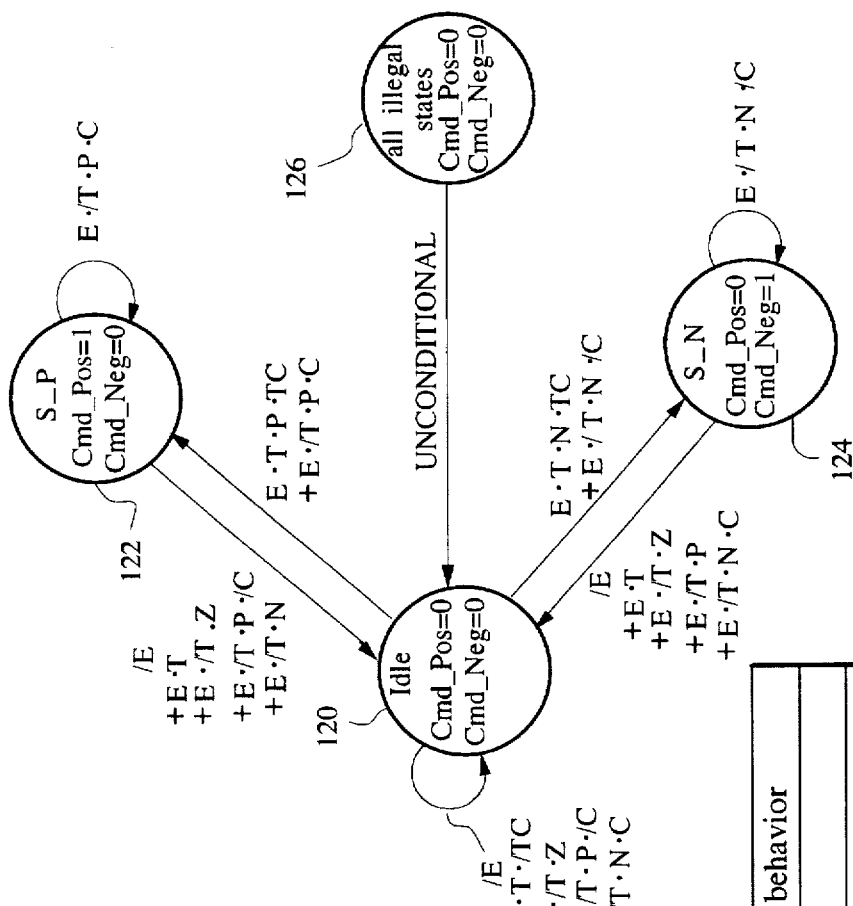

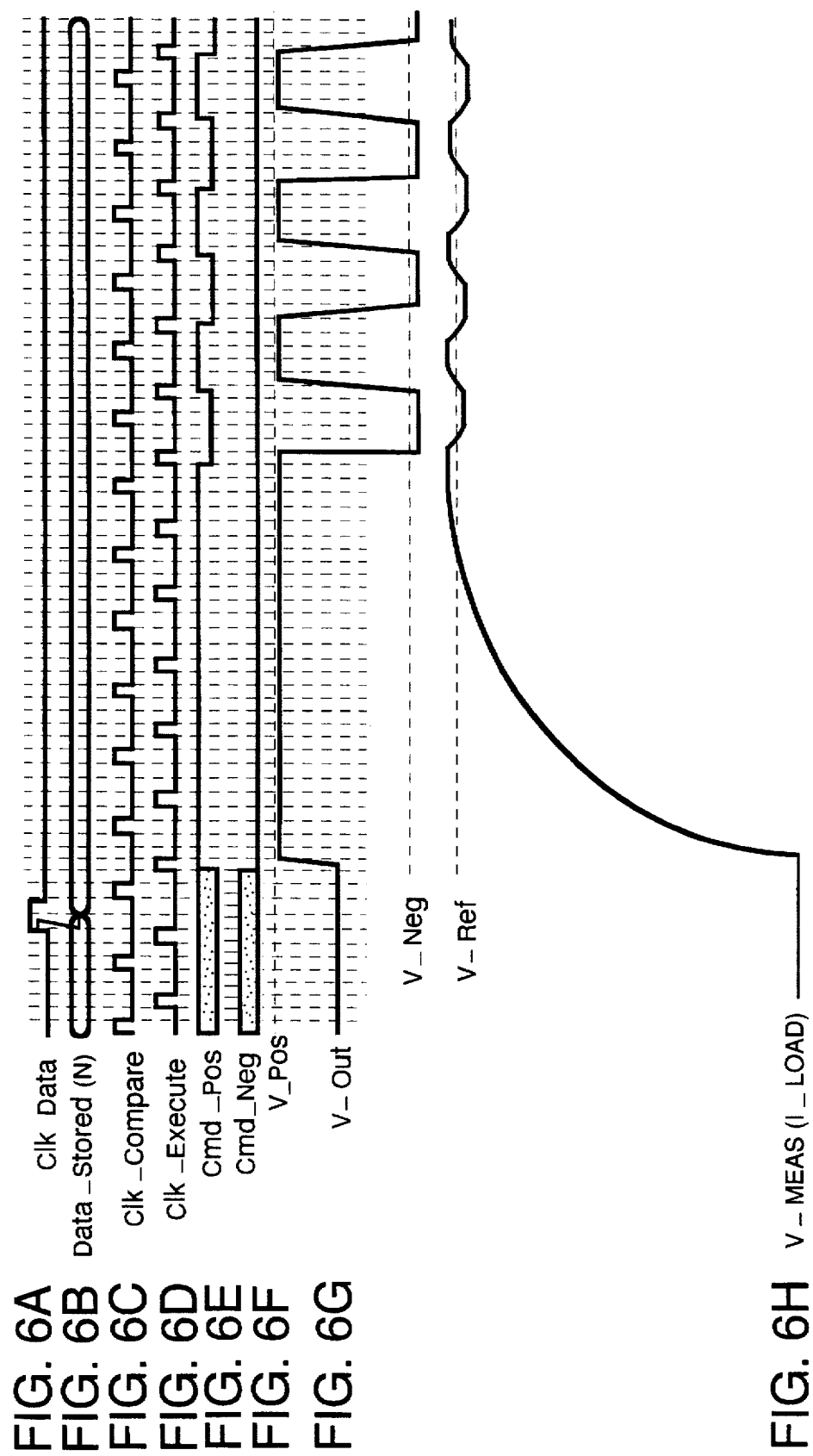

LOW-POWER, HIGH-RELIABILITY SWITCHING ROTARY PHASE SHIFTER DEVICE

TECHNICAL FIELD OF THE INVENTION

This invention relates to phase shifter devices for RF applications, and more particularly to an improved switching rotary phase shifter driver device.

BACKGROUND OF THE INVENTION

Rotary field phase shifters are used in electronically-scanned antennas to control the beam pointing angle in one or both of the azimuth/elevation directions. This invention is a driver circuit for driving the coils of the rotary field phase shifter. The invention has utility in switching power supply circuits.

Referring to FIG. 1, a rotary phase shifter drive circuit 50, known as a switching rotary driver, is used to regulate the current that flows through the coils of a rotary field microwave phase shifter, indicated generally as 80. An N-bit register 52 is used to store a digital word, DATA_STORED (N), that corresponds to the desired current in the coils of load 80 (the simple model of which is an inductor and resistor in series). This word drives a D/A converter (DAC) 54 which produces a reference voltage, V_REF. The current that flows through the load is forced through a reference resistor (R_MEAS) 56, to create a voltage (V_MEAS), that corresponds to the load current. This voltage is then compared to the DAC voltage to determine if the measured current (V_MEAS) is above or below the desired current (V_REF). This comparison is performed by latching comparator 58, which comprises comparator 60 and latch 62. This comparison is periodically latched by CLK_COMPARE, with the resulting decision used to turn on one of two switches 64, 66 that drive either a positive or a negative voltage to the load 80 connected at load node 65, to begin steering the load current in the appropriate direction. The logic levels produced by the latching comparator 58 must be level-shifted and amplified in order to drive the kinds of semiconductor switches (bipolar transistors or FETs) that are capable of delivering the voltages and currents necessary to meet the requirements of typical rotary-field phase shifters. This is accomplished by respective level shifters 68, 70 and amplifiers 72.

FIGS. 3A-3G are waveform diagrams illustrating the timing of the various control signals for the circuit of FIG. 1, and the resulting output voltage (FIG. 3F) and measured load voltage level (FIG. 3G). As shown in FIG. 3G, once the driver reaches the target load current value (in this case a positive current), the feedback loop will cause the signals CMD_POS and CMD_NEG to pulse-width modulate in such a way as to allow the load current to drop below the reference, then re-charge back above the reference. This causes the actual load current to ripple around the desired target current. This ripple can be made acceptably low with the proper choice of CLK_COMPARE frequency for the given reactances around the circuit (primarily the inductance of the load). An enable signal is used to disable the driver by shutting down the level shifters, and turning both switches off.

A problem with this circuit is that, due to the inherent differential nature of the latching comparator's output, both switches (SW_POS and SW_NEG) are being pulse-width-modulated, when in fact only one of them needs to be. This causes excess power to be used in turning the redundant switch on and off.

A second problem with the circuit is that, again due to the complementary outputs of the latching comparator, the transition is made between the state where SW_POS is on and SW_NEG is off, and the state where SW_POS is off and SW_NEG is on, and vice-versa. As these transitions are made, there is a brief period of time when both switches are turned on, resulting in a very low impedance across the power supplies, V_POS and V_NEG. This results in large, peak cross-over currents (also known as simultaneous conduction) that can degrade the reliability of the switches, eventually causing their destruction, depending on the RMS level of these cross-over currents.

The magnitude of these cross-over currents is highly dependent on the relative propagation delays between the level shifters, switch drivers and switches in the positive and negative legs of the circuit. Since these are not well-controlled, the cross-over current can vary widely from unit to unit and drift over time, unless expensive manual select-at-test component selection is done to fine-tune these delays. This cross-over current phenomena is also unnecessary, as only one switch needs to be controlled.

A further problem with the circuit occurs when debugging the circuit with a non-storage type of oscilloscope. The closed feedback loop does not guarantee a regular pattern of transitions on many signals following the latching comparator's outputs. This makes verifying proper timing among various blocks almost impossible, as ghost images are prevalent due to varying pulse widths, making scope triggering sporadic.

SUMMARY OF THE INVENTION

A switching driver circuit is described, which includes a positive voltage supply and a negative voltage supply. First and second switching devices are series connected between the positive voltage supply and the negative voltage supply, with the switch devices connected at a load node. The first switch device is controlled by a command positive signal. The second switch device is controlled by a command negative signal. A load is connected between the load node and a reference resistor element; the reference resistor element in turn is connected to ground. Current flow through the load and the reference resistor element develops a measure voltage across the reference resistor element.

The driver circuit further includes apparatus for providing a reference voltage value corresponding to a desired current through the load. The apparatus includes a register circuit for storing a digital data value representing the desired current through the load, and a digital-to-analog converter for converting the digital data value to the reference voltage value.

Comparator circuitry is employed to compare the reference voltage to the measure voltage, determining if the measure voltage is above or below the reference voltage, and generating a comparator signal representative of the comparison result. Logic circuitry is responsive to the comparator signal and the digital data value representing the desired current through the load for generating the command positive and command negative signals to drive the current through the load to the desired current.

The logic circuitry, switches, load, and comparator circuitry are connected to form a feedback loop, wherein the logic circuitry generates the command positive and command negative signals such that only one of the switches is pulse-width-modulated between the open and closed states at any given time to obtain the desired current through the load. The logic circuitry further includes logical apparatus for preventing the first and second switches from being simultaneously commanded to a switch closed position.

BRIEF DESCRIPTION OF THE DRAWINGS

These and other features and advantages of the present invention will become more apparent from the following detailed description of an exemplary embodiment thereof, as illustrated in the accompanying drawings, in which:

FIGS. 3A–3G are a timing diagram for the circuit of FIG. 1.

FIG. 4 sets out a current mode mapping employed in the logic controller of FIG. 2.

FIG. 5 illustrates the test function employed in the circuit of FIG. 2.

FIGS. 6A–6H are waveform diagrams illustrating the timing of the various control signals for the circuit of FIG. 2, and the resulting output voltage (FIG. 6G) and measured load voltage level (FIG. 6H).

FIG. 7 is a state diagram illustrating the state machine function comprising the logic controller of the circuit of FIG. 2.

DETAILED DESCRIPTION OF THE PREFERRED EMBODIMENT

Figure 2:
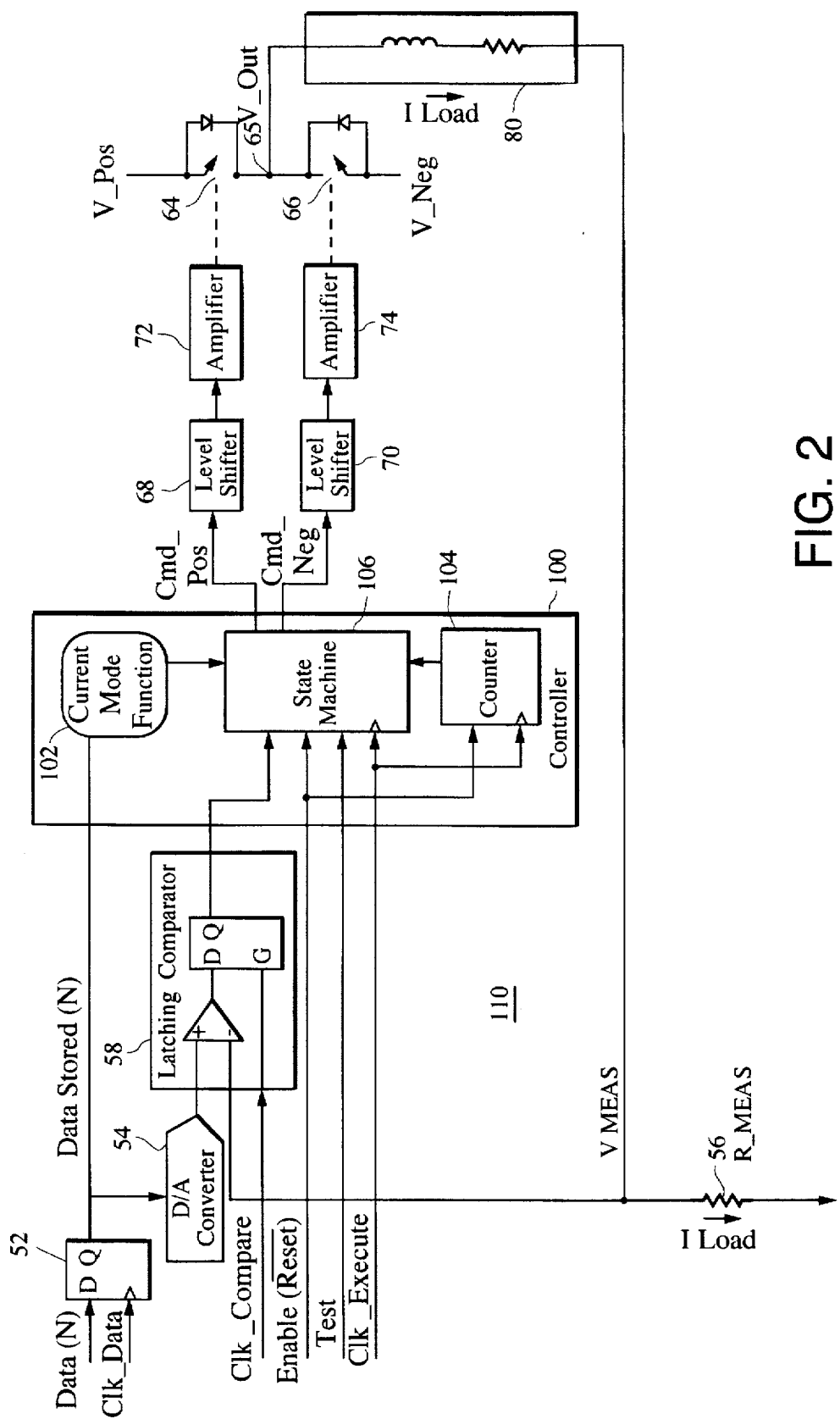
FIG. 2 is a schematic block diagram of a driver circuit for a switching rotary phase shifter as in FIG. 1, but incorporating a logic controller in accordance with an aspect of the invention.

One aspect of the invention is a digital controller 100 which is added to the switching rotary phase shifter driver 50 circuit between the analog front-end (D/A converter 58 and comparator 58) and the analog back-end (level shifters 68, 70, gate drives 72, 74, and switches/FETs 64, 66). FIG. 2 illustrates the resulting circuit. The controller 100 can be implemented in many low-cost/low power CMOS PLDs or ASICs. The functions of the controller 100 can be broken down into three blocks, the current mode mapping function 102, the test counter function 104 and finite state machine (FSM) function 106.

The current mode mapping function 102 examines the desired current word that is being applied to the D/A converter 58, and encodes it into a 2-bit variable (CURRENT_ZONE) to indicate if the desired load current (in Amps) is either positive, negative, or zero. A typical code translation is shown in FIG. 4, where only mnemonics P,Z and N are shown for the 2-bit variable; the actual binary code assigned to the particular mode is arbitrary. This 2-bit variable CURRENT_ZONE is applied to the FSM function 106. Depending on the timing relationship between CLK_DATA (the signal clocking the register 52) and CLK_EXECUTE (the signal clocking the FSM 106 and the test counter function 104), the value of CURRENT_ZONE may have to be re-synchronized to CLK_EXECUTE before entering the FSM 106.

The Test-Mode Timeout Counter 104 is used to achieve a deterministic, regular pattern of switching for one of the output switches 64, 66, when the FSM 106 is in the TEST mode. This aids in debugging by breaking the normal functional feedback loop 110. The counter 104 generates a 1-CLK_EXECUTE clock wide terminal count flag called TEST_CYCLE, that occurs at a duty cycle less than 50% (i.e. the Test Counter must have a minimum of 3 states, only one of which can assert the TEST_CYCLE). In test mode, with the signal TEST asserted, this causes the FSM 106 to break out of the IDLE state and spend one CLK_EXECUTE clock interval in the S_P or S_N state, before unconditionally returning to the IDLE state, where it waits again for TEST_CYCLE, as further illustrated in FIGS. 5 and 7. The duty cycle of TEST_CYCLE is less than 50% in order to insure that the switch being regularly toggled or pulse-width-modulated does not allow a buildup of current in the load that would lead to destruction of the switches and/or the load. The Test-Mode Timeout Counter 104 does not need to be initialized to the FSM 104 or any of its inputs, since in test mode, the FSM self-synchronizes to the counter. The Test-Mode Timeout Counter should be initialized in response to ENABLE=0.

An important aspect of the invention is the FSM 106. It consists of three legal states, the IDLE state, the S_P state and the S_N state, encoded by a minimum of two state variables. The FSM has two outputs, CMD_POS and CMD_NEG, which respectively command the positive and negative switches 64 and 66 to be on. Under no circumstances are both switches ever commanded to be on simultaneously. FIGS. 6A–6H are waveform diagrams illustrating the timing of the various control signals for the circuit of FIG. 2, and the resulting output voltage (FIG. 6G) and measured load voltage level (FIG. 6H).

The state diagram for the FSM 106 is shown in FIG. 7. The ENABLE signal (E) takes precedence over all others and, when off (E=0) sends the machine 106 to the IDLE state 120, wherein both CMD_POS and CMD_NEG are set to zero. Second in priority is the TEST signal (T), which forces the machine into the test mode (T=1) or the normal mode (T=0). In test mode, the machine toggles between the IDLE state and either the S_P state 122 (CMD_POS=1, CMD_NEG=0) or the S_N state 124 (CMD_POS=0, CMD_NEG=1), in response to TEST_CYCLE (TC) and the value (P, N or Z) of CURRENT_ZONE. In normal mode, the machine toggles between IDLE 120 and either S_P 122 or S_N 124, depending on the values of COMPARE (C) and CURRENT_ZONE in order to regulate the current to the target value represented in DATA_STORED(N).

The equations of FIG. 7 use the PALASM (TM) (Programmable Array Logic Assembly Language, Monolithic Memories/Advanced Micro Devices, Inc.) convention, that sum-of-products logic statements can be interpreted as follows. A=B•D̄+C•D means that the output A will be true (asserted) if input B is true and D is false, or if input C is true and D is true; otherwise (else) output A will be false (not asserted). Thus, the notation + represents the logical OR operation, * or • represents the logical AND operation, and / represents the not asserted state.

As indicated by the state equations of FIG. 7, the FSM 106 will remain in the IDLE state when (1) ENABLE is not asserted, or (2) ENABLE is asserted and TEST is asserted and TEST_CYCLE is not asserted, or (3) ENABLE is asserted and TEST is not asserted and Z (the zero current code of CURRENT_ZONE) is asserted, or (4) ENABLE is asserted and TEST is not asserted and P (the positive current code of CURRENT_ZONE) is asserted and the reference current is below (less than) the measured current, or (5) ENABLE is asserted and TEST is not asserted and N (the negative current code of CURRENT_ZONE) is asserted and the reference current is above (greater than) the measured current.

The FSM 106 will change states from the IDLE state 120 to the S_P state 122 when (1) ENABLE and P and TEST and TEST_CYCLE asserted, or (2) ENABLE and P are asserted and the reference current is above (greater than) the measured current, and TEST is not asserted. The FSM 106 will change states from the IDLE state 120 to the S_N state 124 when (1) ENABLE, TEST, N and TEST_CYCLE are asserted, or (2) ENABLE and N are asserted and TEST is not asserted and the reference current is below (less than) the measured current.

Once in the S_P state 122, the machine 106 will remain in state 122 if ENABLE and P are asserted and the reference current is above (greater than) the measured current, and TEST is not asserted. The machine will change states from the S_P state 122 to the IDLE state 120 when (1) ENABLE is not asserted, or (2) ENABLE and TEST are asserted, or (3) ENABLE and Z are asserted and TEST is not asserted, or (4) ENABLE and P are asserted and TEST is not asserted and the reference current is below (less than) the measured current, or (5) ENABLE and N are asserted and TEST is not asserted.

Once in the S_N state 124, the machine 106 will remain in state 124 if ENABLE and N are asserted and TEST is not asserted and the reference current is below (less than) the measured current. The machine will change states from the S_N state 124 to the IDLE state 120 when (1) ENABLE is not asserted, or (2) ENABLE and TEST are asserted, or (3) ENABLE and Z are asserted and TEST is not asserted, or (4) ENABLE and P are asserted and TEST is not asserted, or (5) ENABLE and N are asserted and the reference current is above (greater than) the measured current, and TEST is not asserted.

It is assumed that the signals ENABLE and TEST are generated in such a way as to meet the timing constraints of the FSM, otherwise they may have to be re-synchronized to CLK_EXECUTE before entering the FSM. All sequential logic devices have timing constraints defined by the device manufacturer which declare that certain inputs must behave a certain way with respect to other inputs in order for the device to work properly. This is a conventional consideration in all logic design, and is not peculiar to this invention.

The FSM 106 of this exemplary embodiment (FIG. 7) is a Moore machine. If no combinatorial output decoding is performed on the state variable outputs, then an illegal state with CMD_POS=1 and CMD_NEG=1 may be unavoidable. In that case, the logic power supplies should be valid before the V_POS and V_NEG power supplies, to avoid actively driving both switches 62 and 64. Other types of state machines can alternatively be employed, such as a Mealy machine. The particular number of state variables, and the specific encoding of the state variables, can vary, depending on the particular application. If the particular implementation of the machine includes illegal states that can cause both outputs to be turned on, then in that case, the logic power supplies should be valid before the V_POS and V_NEG power supplies, to avoid actively driving both switches 62 and 64 simultaneously. If the specific implementation of the machine includes output decoding, then the outputs must be either registered or made hazard/glitch-free. This is because, when one or more inputs to a combinatorial logic cloud changes, the output(s) can briefly change to values other than their final, steady state value depending on how the logic function is constructed, the propagation delays of the elements that make up that function, and the relative times that the input(s) change state. Such intermediate logic states on the output(s) are known as logic hazards, and can sometimes be eliminated by adding functionally redundant terms to the combinatorial logic. If the application can tolerate it, the logic hazards can also be eliminated by putting a register after the combinatorial logic output and clocking it after intermediate/hazard logic states have disappeared.

Note that the diodes across the switches act to conduct the inductive kickback when relaxing the circuit. This allows discharging of the load current when the modulating switch is off, without causing breakdown of the modulating switch. This diode can be discrete, but historically is inherent to the semiconductor switch, i.e. the body diode of a MOSFET.

Figure 1:
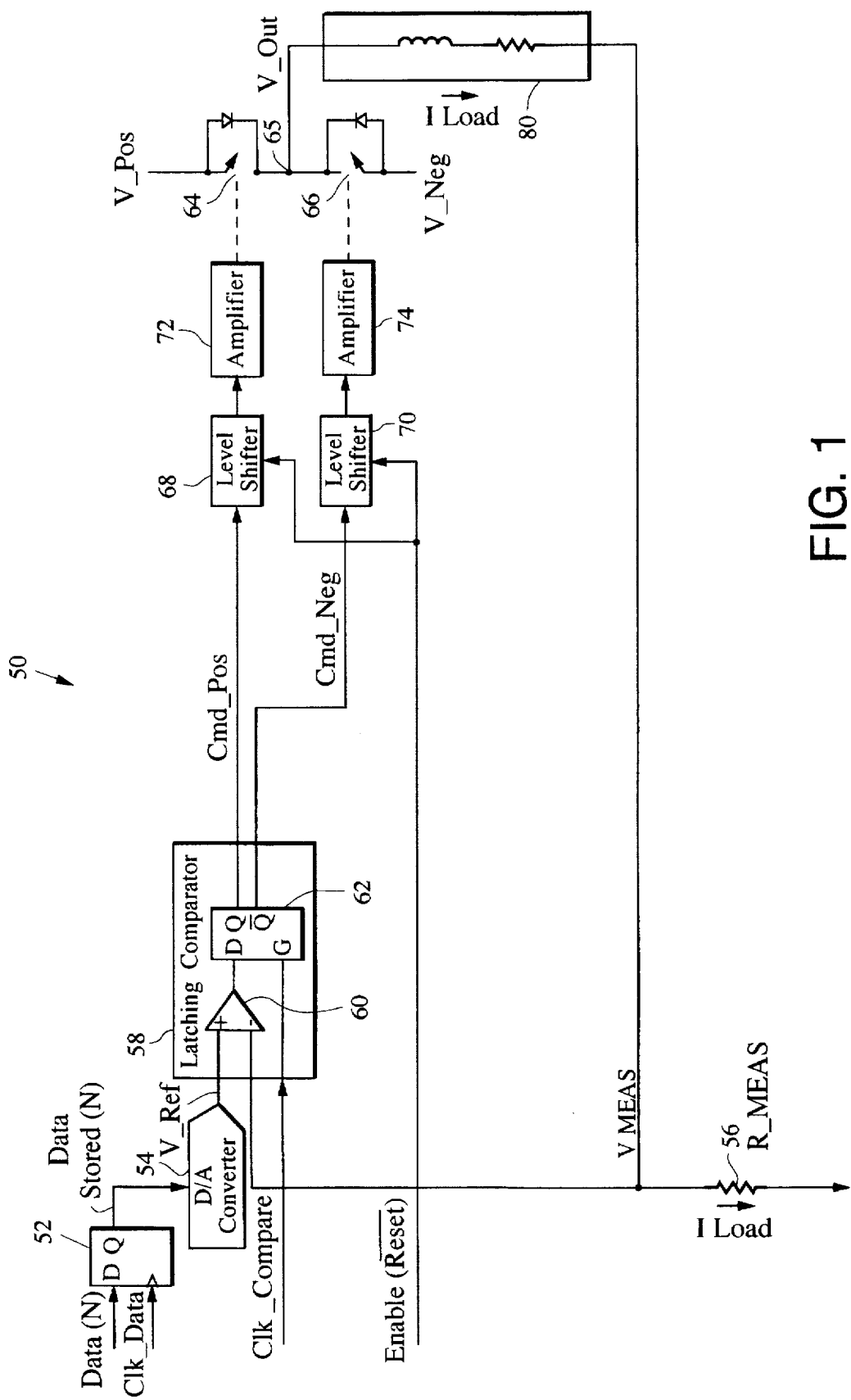
FIG. 1 is a schematic block diagram of a driver circuit for a switching rotary phase shifter.

Although the driver circuit of FIG. 2 does add circuitry above and beyond the driver circuit of FIG. 1, this circuit is small (fits into small programmable logic devices (PLDs)) and dissipates much less power (CMOS) than the switching power that it saves by pulse-width-modulating only one switch and eliminating the simultaneous conduction power loss. Also, the extra clock (CLK_EXECUTE) can be a phase-shifted version of the existing latch clock (CLK_COMPARE), time-delayed such that FSM timing constraints are met.

Power is reduced by not toggling the redundant switch, and by not toggling any switch when the commanded current is zero (CURRENT_ZONE=Z). Reliability is improved by eliminating the cross-over current phenomena, i.e there are no transitions between the states S_P 122 and S_N 124.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A switching driver circuit, comprising:

a positive voltage supply;

a negative voltage supply;

a first switch device and a second switch device series connected between said positive voltage supply and said negative voltage supply, said switch devices connected at a load node, said first switch device controlled by a command positive signal, said second switch device controlled by a command negative signal;

a load connected to the load node;

measure circuitry for developing a measure voltage value indicative of a current flow through the load;

apparatus responsive to a digital reference data value representing a desired current through the load for providing a reference voltage value corresponding to the desired current through the load;

comparator circuitry for comparing the reference voltage value to the measure voltage value and generating a comparator signal representative of the comparison result; and control circuitry responsive to the comparator signal and said digital reference data value representing the desired current through the load for generating said command positive and command negative signals to drive the current through the load to the desired current, said control circuitry, said switches, said load, and said comparator circuitry connected to form a feedback loop, wherein the control circuitry generates the command positive and command negative signals such that only one of said switches is being toggled between the open and closed states at any given time to obtain the desired current through the load, and wherein the control circuitry includes logical apparatus for preventing the first and second switches from being simultaneously commanded to a switch closed position.

2. The driver circuit of claim 1 wherein the control circuitry includes a current mode mapping apparatus for mapping the digital reference data value representing the desired current through the load into a digital current mode data value indicating that the desired current is positive, negative or zero.

3. The driver circuit of claim 2 wherein the logical apparatus for preventing the first and second switches from being simultaneously being commanded to a closed state is responsive to said digital current mode data value.

4. The driver circuit of claim 1 wherein the control circuitry includes a finite state machine comprising three legal states, said states including an idle state wherein both switches are commanded to the B open state, a positive current state wherein said first switch device is commanded to a closed state and said second switch device is commanded to an open state, and a negative current state wherein said first switch device is commanded to an open state and said second switch is commanded to a closed state.

5. The driver circuit of claim 4 wherein said state machine comprises logical means for preventing direct transitions between said positive current state and said negative current states.

6. The driver circuit of claim 1 wherein the apparatus responsive to a digital reference data value comprises a digital-to-analog converter.

7. The driver circuit of claim 1 wherein the control circuit further comprises a test function circuit apparatus responsive to a test control signal to disable operation of said feedback loop and to provide a deterministic, regular pattern of switching for one of said switch devices.

8. The driver circuit of claim 7 wherein the test function circuit includes a test mode timeout counter clocked by a clock signal and producing a terminal count flag signal occurring at a duty cycle less than 50%, wherein said one of said switch devices is closed when said terminal count flag signal is asserted.

9. The driver circuit of claim 1 wherein said load comprises a rotary field microwave phase shifter.

10. A switching driver circuit, comprising:

a positive voltage supply;

a negative voltage supply;

a first switch device and a second switch device series connected between said positive voltage supply and said negative voltage supply, said switch devices connected at a load node, said first switch device controlled by a command positive signal, said second switch device controlled by a command negative signal;

a reference resistor element;

a load connected between the load node and a first terminal of the reference resistor element, a second terminal of the reference resistor element connected to ground, wherein current flow through the load and the reference resistor element develops a measure voltage across the reference resistor element;

apparatus for providing a reference voltage value corresponding to a desired current through the load, said apparatus including a register circuit for storing a digital data value representing the desired current through the load, and a digital-to-analog converter for converting the digital data value to the reference voltage value;

comparator circuitry for comparing the reference voltage to the measure voltage, determining if the measure voltage is above or below the reference voltage, and generating a comparator signal representative of the comparison result; and logic circuitry responsive to the comparator signal and said digital data value representing the desired current through the load for generating said command positive and command negative signals to drive the current through the load to the desired current, said logic circuitry, said switches, said load, and said comparator circuitry connected to form a feedback loop, wherein the logic circuitry generates the command positive and command negative signals such that only one of said switches is pulse-width-modulated between the open and closed states at any given time to obtain the desired current through the load, and wherein the logic circuitry includes logical apparatus for preventing the first and second switches from being simultaneously commanded to a switch closed position.

11. The driver circuit of claim 10 wherein the logic circuitry includes a current mode mapping apparatus for mapping the digital data value representing the desired current through the load into a digital current mode data value indicating that the desired current is positive, negative or zero.

12. The driver circuit of claim 11 wherein the logical apparatus for preventing the first and second switches from being simultaneously being commanded to a closed state is responsive to said digital current mode data value.

13. The driver circuit of claim 10 wherein the logic circuitry includes a finite state machine comprising three legal states, said states including an idle state wherein both switches are commanded to the open state, a positive current state wherein said first switch device is commanded to a closed state and said second switch device is commanded to an open state, and a negative current state wherein said first switch device is commanded to an open state and said second switch is commanded to a closed state.

14. The driver circuit of claim 13 wherein said state machine comprises logical means for preventing direct transitions between said positive current state and said negative current states.

15. The driver circuit of claim 10 wherein the logic circuit further comprises a test function circuit apparatus responsive to a test control signal to disable operation of said feedback loop and to provide a deterministic, regular pattern of switching for one of said switch devices.

16. The driver circuit of claim 5 wherein the test function circuit includes a test mode timeout counter clocked by a clock signal and producing a terminal count flag signal occurring at a duty cycle less than 50%, wherein said one of said switch devices is closed when said terminal count flag signal is asserted.

17. The driver circuit of claim 10 wherein said load comprises a rotary field microwave phase shifter.

* * * * *